United States Patent
Tamao et al.

(10) Patent No.: US 12,472,978 B2
(45) Date of Patent: Nov. 18, 2025

(54) INFORMATION MANAGEMENT DEVICE, NON-TRANSITORY COMPUTER-READABLE STORAGE MEDIUM STORING INFORMATION MANAGEMENT PROGRAM, AND METHOD FOR MANAGING INFORMATION

(71) Applicant: TOYOTA JIDOSHA KABUSHIKI KAISHA, Toyota (JP)

(72) Inventors: Junichiro Tamao, Tokyo (JP); Takahiro Utsunomiya, Tokyo (JP); Takumi Horie, Chofu (JP); Tomoaki Karasawa, Matsudo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 210 days.

(21) Appl. No.: 18/508,804

(22) Filed: Nov. 14, 2023

(65) Prior Publication Data

US 2024/0182068 A1 Jun. 6, 2024

(30) Foreign Application Priority Data

Dec. 1, 2022 (JP) .................. 2022-192904

(51) Int. Cl.
*B60W 60/00* (2020.01)
*B60W 30/06* (2006.01)
*G06F 9/455* (2018.01)

(52) U.S. Cl.
CPC ........... *B60W 60/001* (2020.02); *B60W 30/06* (2013.01); *G06F 9/45558* (2013.01); *G06F 2009/45583* (2013.01)

(58) Field of Classification Search
CPC . B60W 60/001; B60W 30/06; G06F 9/45558; G06F 2009/45583; G06F 3/061; G06F 3/0653; G06F 3/0659; G06F 3/0671; G06F 2212/1036; G06F 2212/152; G06F 2212/7204; G06F 12/0238; G06F 2212/173; G06F 2212/7211; G06F 11/14
USPC .................................. 711/147, 100
See application file for complete search history.

(56) References Cited

U.S. PATENT DOCUMENTS

| | | | |
|---|---|---|---|
| 2015/0143019 A1* | 5/2015 | Sankar | G06F 3/0653 711/102 |
| 2018/0113638 A1* | 4/2018 | Petersen | G06F 3/0619 |
| 2022/0083428 A1* | 3/2022 | Kurita | G06F 11/1441 |

FOREIGN PATENT DOCUMENTS

JP  2020-194333 A  12/2020

* cited by examiner

*Primary Examiner* — Masud K Khan
*Assistant Examiner* — Zubair Ahmed
(74) *Attorney, Agent, or Firm* — Oblon, McClelland, Maier & Neustadt, L.L.P.

(57) ABSTRACT

An execution unit calculates a first remaining rate that is a rate of a remaining number of times data is allowed to be written to a storage area during execution of the first operating system relative to a first upper limit count. The execution unit calculates a total remaining rate that is a rate of a remaining number of times data is allowed to be written to the storage area during execution of the first operating system and the second operating system relative to a total upper limit count. The execution unit changes a value of the first remaining rate to a value of the total remaining rate when the first remaining rate is greater than the total remaining rate.

6 Claims, 2 Drawing Sheets

INFORMATION MANAGEMENT DEVICE, NON-TRANSITORY COMPUTER-READABLE STORAGE MEDIUM STORING INFORMATION MANAGEMENT PROGRAM, AND METHOD FOR MANAGING INFORMATION

BACKGROUND

1. Field

The following description relates to an information management device, a non-transitory computer-readable storage medium storing an information management program, and a method for managing information.

2. Description of Related Art

Japanese Laid-Open Patent Publication No. 2020-194333 describes an information management device for a vehicle. The information management device includes an execution unit and a storage unit. The storage unit stores a first operating system and a second operating system.

In an information management device such as that described in the above patent document, when the execution unit executes each operating system, the execution may store data in the same storage unit. The storage unit stably stores data as long as the number of times data is written is within an upper limit. That is, the storage unit has a product life that is a certain number of times in which data can be written.

For example, the execution unit may write data only a few times when executing the first operating system and write data many times when executing the second operating system. The transfer of data between the first operating system and the second operating system is restricted so that the operating systems do not interfere with each other. Thus, in the above example, the execution unit will not recognize the number of times data has been written to the storage unit when executing the first operating system. Thus, even if the number of times data has been written to the storage unit exceeds the upper limit when the second operating system is executed, the execution unit will execute the first operating system and store data in the storage unit as normal even though the data storage count has exceeded the upper limit.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an information management device is provided. The information management device includes a processor and a memory. The memory stores a first operating system and a second operating system. The processor is configured to store data in a storage area of the memory when the first operating system is being executed. The processor is configured to store data in the storage area of the memory when the second operating system is being executed. The processor is configured to calculate a first remaining rate that is a rate of a remaining number of times data is allowed to be written to the storage area during execution of the first operating system relative to a first upper limit count. The first upper limit count is a number of times data is allowed to be stored in the storage area during execution of the first operating system, and a second upper limit count is a number of times data is allowed to be stored in the storage area during execution of the second operating system. The processor is configured to calculate a total remaining rate that is a rate of a remaining number of times data is allowed to be written to the storage area during execution of the first operating system and the second operating system relative to a total upper limit count obtained by adding the first upper limit count to the second upper limit count. The processor is configured to change a value of the first remaining rate to a value of the total remaining rate when the first remaining rate is greater than the total remaining rate.

In another general aspect, a non-transitory computer-readable storage medium storing an information management program applied to a computer is provided. The computer includes a memory storing a first operating system and a second operating system, and a processor configured to store data in a storage area of the memory when the first operating system and the second operating system are being executed. A first upper limit count is a number of times data is allowed to be stored in the storage area during execution of the first operating system, and a second upper limit count is a number of times data is allowed to be stored in the storage area during execution of the second operating system. The information management program has the processor calculate a first remaining rate that is a rate of a remaining number of times data is allowed to be written to the storage area during execution of the first operating system relative to the first upper limit count. The information management program has the processor calculate a total remaining rate that is a rate of a remaining number of times data is allowed to be written to the storage area during execution of the first operating system and the second operating system relative to a total upper limit count obtained by adding the first upper limit count to the second upper limit count. The information management program has the processor change a value of the first remaining rate to a value of the total remaining rate when the first remaining rate is greater than the total remaining rate.

In another general aspect, a method for managing information performed by a computer is provided. The computer includes a memory storing a first operating system and a second operating system and a processor configured to store data in a storage area of the memory when the first operating system and the second operating system are being executed. A first upper limit count is a number of times data is allowed to be stored in the storage area during execution of the first operating system, and a second upper limit count is a number of times data is allowed to be stored in the storage area during execution of the second operating system. The method includes calculating a first remaining rate that is a rate of a remaining number of times data is allowed to be written to the storage area during execution of the first operating system relative to the first upper limit count with the processor, calculating a total remaining rate that is a rate of a remaining number of times data is allowed to be written to the storage area during execution of the first operating system and the second operating system relative to a total upper limit count obtained by adding the first upper limit count to the second upper limit count with the processor, and changing a value of the first remaining rate to a value of the total remaining rate with the processor when the first remaining rate is greater than the total remaining rate.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Embodiment

An information management device, a non-transitory computer-readable storage medium storing an information management program, and a method for managing information according to one embodiment will now be described with reference to the drawings. A vehicle including the information management device will be described hereafter.

Control System of Vehicle

Figure 1:
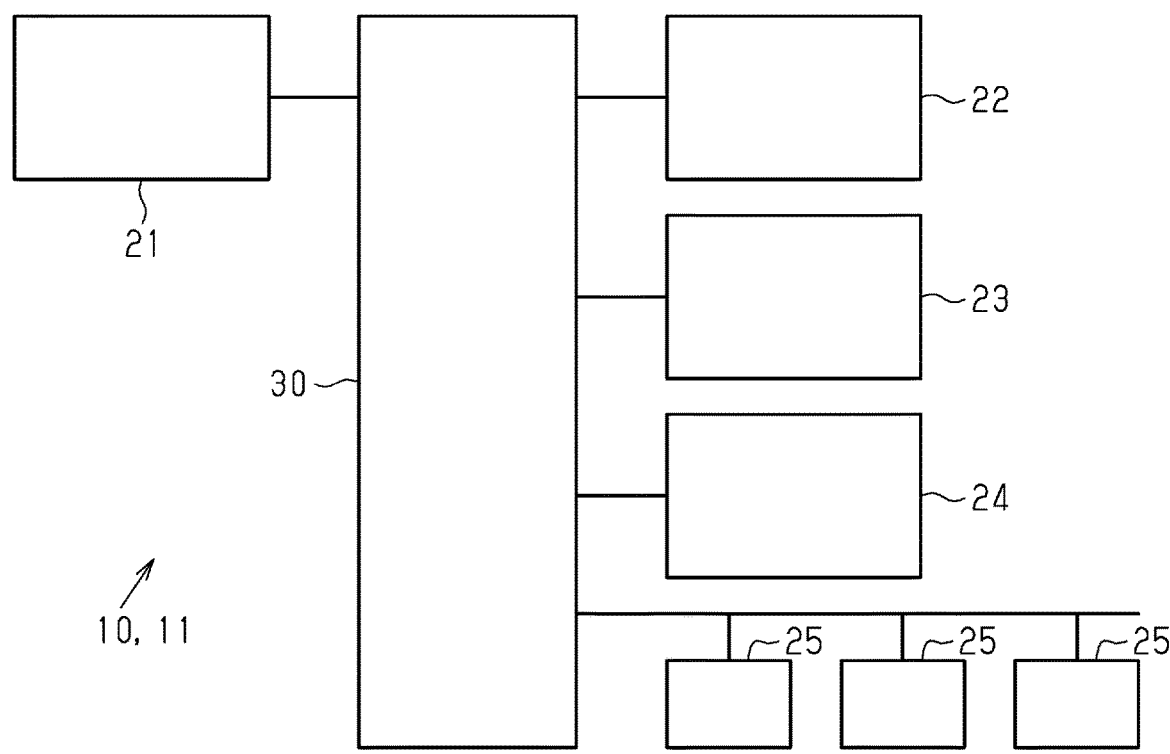
FIG. 1 is a schematic view of a vehicle control system.

As shown in FIG. 1, a vehicle 10 includes a control system 11. The control system 11 includes a wireless communication device 21, a multimedia electronic control unit (ECU) 22, a meter ECU 23, an advanced safety ECU 24, physical ECUs 25, and an information management device 30. The information management device 30 may be referred to as a central ECU.

The wireless communication device 21 is connected to the information management device 30 by a communication bus. The wireless communication device 21 receives a signal from outside the vehicle 10 through a wireless communication network. The wireless communication device 21 transmits a signal to the information management device 30 through the communication bus.

The multimedia ECU 22 is connected to the information management device 30 by a communication bus. The multimedia ECU 22 controls, for example, the output of a touch display in response to a signal received from the information management device 30. The multimedia ECU 22 outputs, for example, data for a navigation image and a menu image to a display. In addition, the multimedia ECU 22 obtains an input signal from the touch display, for example, when the touch display is operated. Further, the multimedia ECU 22 controls the audio data output to, for example, a loudspeaker. The multimedia ECU 22 outputs video and audio information in this manner.

The meter ECU 23 is connected to the information management device 30 by a communication bus. The meter ECU 23 controls, for example, the data output to a display of a meter panel in response to a signal received from the information management device 30. The meter ECU 23 outputs information related to the state of a vehicle 10 and safety of the vehicle 10, such as speed, warnings, remaining fuel, and fastening of a seat belt, to the display of the meter panel.

The advanced safety ECU 24 is connected to the information management device 30 by a communication bus. The advanced safety ECU 24 includes a central processing unit (CPU) and a read only memory (ROM). The ROM stores applications.

The advanced safety ECU 24 obtains detection values from multiple sensors (not shown) of the vehicle 10. The CPU of the advanced safety ECU 24 uses the detection values from the sensors when executing applications stored in the ROM. Then, the CPU of the advanced safety ECU 24 outputs data indicative of an action request associated with an application to implement the functionality of the application. The advanced safety ECU 24 sends a signal including the data indicative of the action request to the information management device 30.

Each application is a program that implements the functionality of an advanced driver-assistance system. One example of an application is an adaptive cruise control (ACC) application that allows the vehicle 10 to keep pace with a vehicle that it is following by generating accelerating and decelerating requests to the power train and brake of the vehicle 10.

Another example of the application is an autonomous parking application for automatically parking the vehicle 10. The autonomous parking application generates accelerating and decelerating requests to the power train and brake to move the vehicle 10 into a target parking space. Further, the automatic autonomous parking application generates a target steering angle for a steering device of the vehicle 10 to move the vehicle 10 into the target parking space.

The physical ECUs 25 are connected to the information management device 30 by a communication bus. The physical ECUs 25 each control an actuator of the vehicle 10. For example, one of the physical ECUs 25 controls the engine of the power train of the vehicle 10. Further, for example, one of the physical ECUs 25 controls the brake device of the vehicle 10. For example, one of the physical ECUs 25 controls the steering device of the vehicle 10.

Information Management Device

Figure 2:
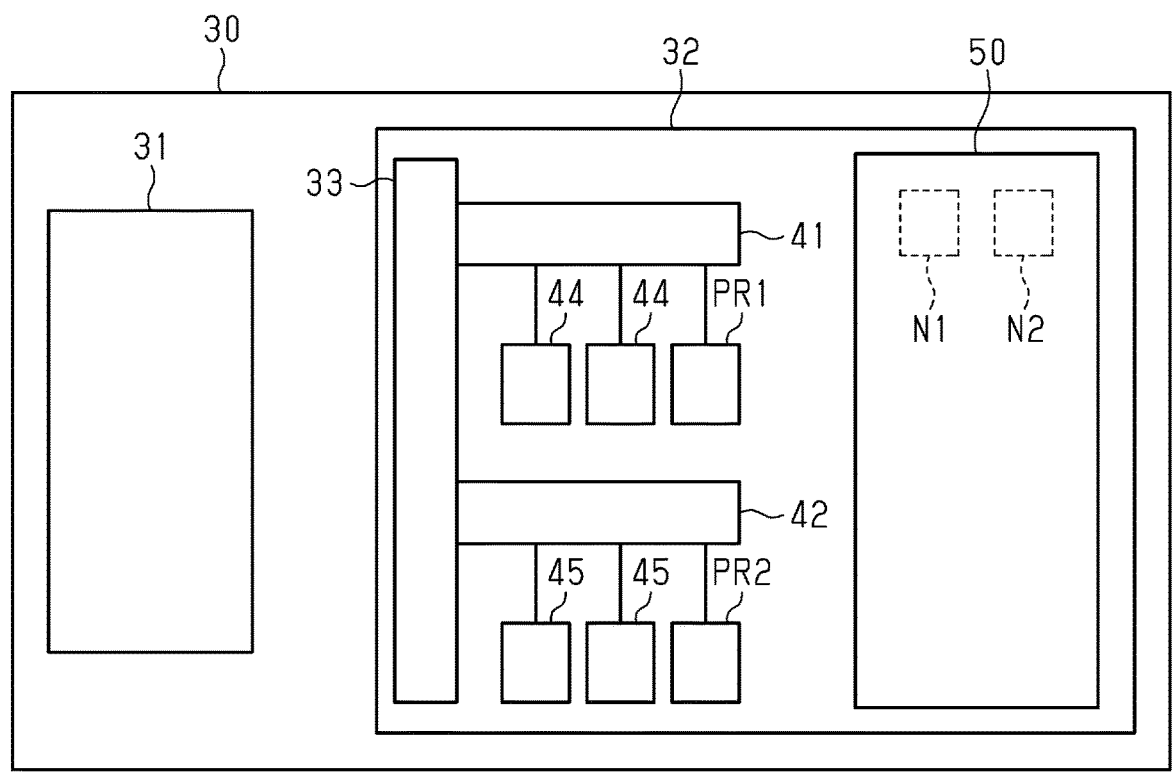
FIG. 2 is a block diagram showing an information management device.

As shown in FIG. 2, the information management device 30 includes an execution unit 31 and a storage unit 32. The information management device 30 is a single computer. The execution unit 31 is a CPU or a processor. The storage unit 32 is a memory such as ROM and RAM. More specifically, the storage unit 32 is an Embedded Multi Media Card (eMMC®).

The storage unit 32 stores a hypervisor 33, a first operating system 41 and a second operating system 42. The hypervisor 33 is software that builds a virtual environment in which multiple operating systems can be operated.

The first operating system 41 and the second operating system 42 run on the hypervisor 33. Thus, the first operating system 41 and the second operating system 42 can be executed in parallel by the execution unit 31. In other words, the two operating systems run when the execution unit 31 executes the first operating system 41 and the second operating system 42 in parallel. The hypervisor 33 restricts the transfer of information between the first operating system 41 and the second operating system 42 so that the operating systems do not interfere with each other.

The storage unit 32 stores multiple first applications 44, which are application programs for the first operating system 41. The first applications 44 run on the first operating system 41. Thus, the first applications 44 are executed by the execution unit 31 on the first operating system 41 when the first operating system 41 is executed.

The storage unit 32 stores multiple second applications 45, which are application programs for the second operating system 42. The second applications 45 run on the second operating system 42. Thus, the second application 45 are executed by the execution unit 31 on the second operating system 42 when the second operating system 42 is executed.

The storage unit 32 includes a storage area 50. The storage area 50 stores data. The first operating system 41 and the second operating system 42 share the storage area 50 to store data when executed.

The execution unit 31 stores data in the storage area 50 when executing the first operating system 41. In this case, the execution unit 31 counts the number of times data is stored, or the data storage count, when executing the first operating system 41. The execution unit 31 stores the count value in the storage unit 32. Further, the execution unit 31 stores data in the storage area 50 when executing the second operating system 42. In this case, the execution unit 31 counts the number of times data is stored when executing the second operating system 42. The execution unit 31 stores the count value in the storage unit 32.

The number of times data is stored corresponds to the number of times data is written to the same memory cell when an application is executed. Storing data includes writing information to an empty memory cell in addition to overwriting the stored content of a memory cell in which information has been saved. The storage unit 32 stores the number of times data is stored from when the information management device 30 is initially used. That is, the execution unit 31 updates the data storage count whenever storing data in the storage unit 32.

The execution unit 31 executes each first application 44 to implement the functionality of the first application 44. The execution unit 31 executes each second application 45 to implement the functionality of the second application 45.

The storage unit 32 stores a first upper limit count N1 and a second upper limit count N2 in advance. The first upper limit count N1 is the upper limit for the first operating system 41 to store data in the storage area 50. The first upper limit count N1 is a predetermined value. The second upper limit count N2 is the upper limit for the second operating system 42 to store data in the storage area 50. The second upper limit count N2 is a predetermined value. For example, the first upper limit count N1 and the second upper limit count N2 are set as follows. First, a total upper limit count of the storage area 50 is obtained. The total upper limit count is the number of times data can be written to a single memory cell or a predetermined memory frame. The total upper limit count is, for example, determined based on the type of the storage unit 32 or the like. Thus, the total capacity of data, including overwriting, that can be stored in the storage area 50 is a value obtained by multiplying the total upper limit count by the capacity of the memory cells or the memory frames or by multiplying the total upper limit count by the amount of the memory cells or the memory frames. Next, a usage ratio of the first operating system 41 to the second operating system 42 is set. Then, values of the usage ratio of the total upper limit count are set as the first upper limit count N1 and the second upper limit count N2.

Method for Managing Information Under First Operating System

The storage unit 32 stores a first information management program PR1 that runs on the first operating system 41. The first information management program PR1 has a computer execute a method for managing information under the first operating system 41. The method for managing information under the first operating system 41 includes a step of calculating a first remaining rate R1, a step of calculating a total remaining rate RA, and a step of changing the first remaining rate R1. In the present embodiment, the first remaining rate R1 and the total remaining rate RA are represented as a first remaining percentage R1 and a total remaining percentage RA.

The execution unit 31 executes the first information management program PR1 in response to a predetermined request signal received from a device outside the vehicle 10. Such an external device is, for example, an inspection device used at a car dealer or the like. The request signal is received when the vehicle 10 is inspected with the inspection device. That is, the information management device 30, which is a computer, executes the first information management program PR1 to perform the method for managing information with the first operating system 41.

Figure 3:
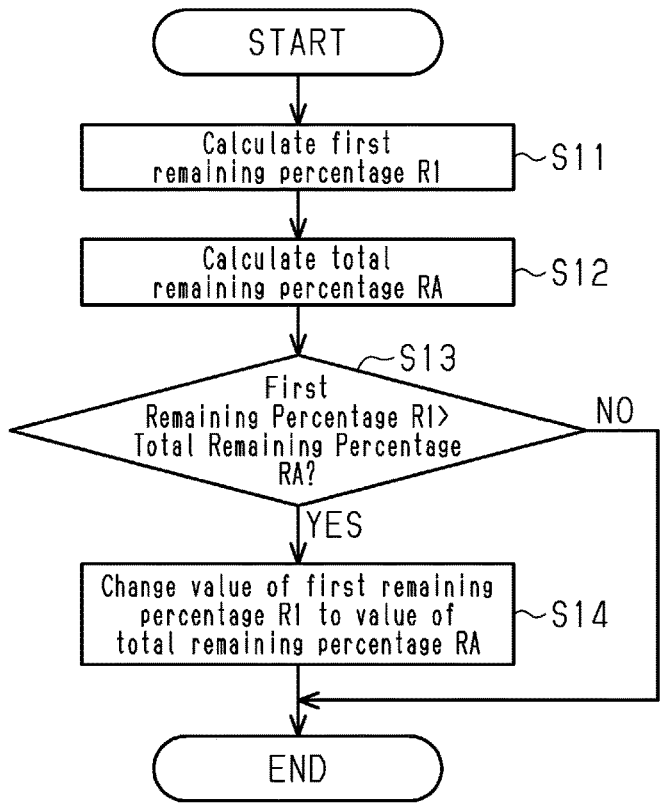
FIG. 3 is a flowchart showing a process performed by the information management device.

As shown in FIG. 3, the execution unit 31 initiates execution of the first information management program PR1 and performs step S11. In step S11, the execution unit 31 calculates the first remaining percentage R1. The first remaining percentage R1 is the percentage of the remaining count allowed for the first operating system 41 to write data in the storage area 50 relative to the first upper limit count N1.

Specifically, the execution unit 31 calculates the first remaining percentage R1 using the number of times data has been stored during execution of the first operating system 41, the first upper limit count N1, and the previously calculated first remaining percentage R1. First, the execution unit 31 uses the previously calculated first remaining percentage R1 to calculate a remaining data storage count, which is the remaining number of times data can be written to the storage area 50 during the present execution of the first operating system 41. Next, the execution unit 31 subtracts, from the remaining data storage count, the number of times data has been stored during the present execution of the first operating system 41. Then, the execution unit 31 calculates the first remaining percentage R1 by dividing the difference by the first upper limit count N1. When there is no previously calculated first remaining percentage R1, that is, when the first remaining percentage R1 is calculated for the first time, the execution unit 31 sets the previously calculated first remaining percentage R1 to 100. Then, the execution unit 31 proceeds to step S12.

In step S12, the execution unit 31 calculates the total remaining percentage RA. Specifically, first, the execution unit 31 calculates the total data storage count by adding the number of times data has been stored during execution of the first operating system 41 and the number of times data has been stored during execution of the second operating system 42. Next, the execution unit 31 calculates the total upper limit count, that is, a sum of the first upper limit count N1 and the second upper limit count N2. Then, the execution unit 31 calculates the total remaining percentage RA by subtracting the total data storage count from the upper limit count and dividing the difference by the upper limit count.

The hypervisor 33 allows the first operating system 41 to access information related to the data storage count of the second operating system 42 only when step S12 is being processed. Then, the execution unit 31 proceeds to step S13.

In step S13, the execution unit 31 determines whether the first remaining percentage R1 is greater than the total remaining percentage RA. When the first remaining percentage R1 is less than or equal to the total remaining percentage RA (S13: NO), the execution unit 31 ends the process. When the first remaining percentage R1 is greater than the total remaining percentage RA (S13: YES), the execution unit 31 proceeds to step S14.

In step S14, the execution unit 31 changes the value of the first remaining percentage R1, calculated in step S11, to the value of the total remaining percentage RA calculated in step S12. In other words, when the value of the first remaining percentage R1 is greater than the value of the total remaining percentage RA, the execution unit 31 changes the value of the first remaining percentage R1, calculated in the method for managing information in the present execution, to the value of the total remaining percentage RA. Then, the execution unit 31 ends the process.

Method for Managing Information Under Second Operating System

The storage unit 32 stores a second information management program PR2 that runs on the second operating system 42. The second information management program PR2 has a computer execute a method for managing information under the second operating system 42. The method for managing information under the second operating system 42 includes a step of calculating a second remaining rate R2, a step of calculating a total remaining rate RA, and a step of changing the second remaining rate R2. In the present embodiment, the second remaining rate R2 and the total remaining rate RA are represented as a second remaining percentage R1 and a total remaining percentage RA.

The execution unit 31 executes the second information management program PR2 in response to a predetermined request signal received from a device outside the vehicle 10. Such an external device is, for example, an inspection device used at a car dealer or the like. The request signal is received when the vehicle 10 is inspected with the inspection device. That is, the information management device 30, which is a computer, executes the second information management program PR2 to perform the method for managing information with the second operating system 42.

Figure 4:
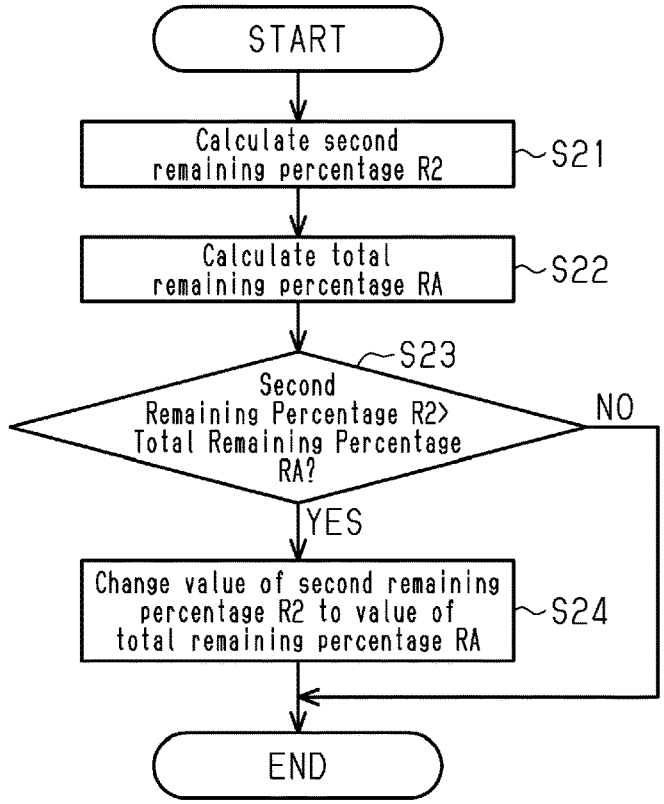
FIG. 4 is a flowchart showing a process performed by the information management device.

As shown in FIG. 4, the execution unit 31 initiates execution of the second information management program PR2 and performs step S21. In step S21, the execution unit 31 calculates the second remaining percentage R2. The second remaining percentage R2 is the percentage of the remaining count allowed for the second operating system 42 to write data in the storage area 50 relative to the second upper limit count N2.

Specifically, the execution unit 31 calculates the second remaining percentage R2 using the number of times data has been stored during execution of the second operating system 42, the second upper limit count N2, and the previously calculated second remaining percentage R2. First, the execution unit 31 uses the previously calculated second remaining percentage R2 to calculate a remaining data storage count, which is the remaining number of times data can be written to the storage area 50 during the present execution of the second operating system 42. Next, the execution unit 31 subtracts, from the remaining data storage count, the number of times data has been stored during the present execution of the second operating system 42. Then, the execution unit 31 calculates the second remaining percentage R2 by dividing the difference by the second upper limit count N2. When there is no previously calculated second remaining percentage R2, that is, when the second remaining percentage R2 is calculated for the first time, the execution unit 31 sets the previously calculated second remaining percentage R2 to 100. Then, the execution unit 31 proceeds to step S22.

In step S22, the execution unit 31 calculates the total remaining percentage RA. Specifically, first, the execution unit 31 calculates the total data storage count by adding the number of times data has been stored during execution of the first operating system 41 and the number of times data has been stored during execution of the second operating system 42. Next, the execution unit 31 calculates the total upper limit count, that is, a sum of the first upper limit count N1 and the second upper limit count N2. Then, the execution unit 31 calculates the total remaining percentage RA by subtracting the total data storage count from the upper limit count and dividing the difference by the upper limit count. The hypervisor 33 allows the second operating system 42 to access information related to the data storage count of the first operating system 41 only when step S22 is being processed. Then, the execution unit 31 proceeds to step S23.

In step S23, the execution unit 31 determines whether the second remaining percentage R2 is greater than the total remaining percentage RA. When the second remaining percentage R2 is less than or equal to the total remaining percentage RA (S23: NO), the execution unit 31 ends the process. When the second remaining percentage R2 is greater than the total remaining percentage RA (S23: YES), the execution unit 31 proceeds to step S24.

In step S24, the execution unit 31 changes the value of the second remaining percentage R2, calculated in step S21, to the value of the total remaining percentage RA calculated in step S22. In other words, when the value of the second remaining percentage R2 is greater than the value of the total remaining percentage RA, the execution unit 31 changes the value of the second remaining percentage R2, calculated in the method for managing information in the present execution, to the value of the total remaining percentage RA. Then, the execution unit 31 ends the process.

Operation of Embodiment

In the above embodiment, the execution unit 31 executes the first operating system 41 and the second operating system 42. However, the transfer of data is restricted between the first operating system 41 and the second operating system 42 that are virtualized by the hypervisor 33.

In the above embodiment, for example, even if the number of times data has been stored during execution of the second operating system 42 is small, the number of times data has been stored during execution of the first operating system 41 may be large. In this case, the total remaining percentage RA will be less than the first remaining percentage R1. Further, for example, even if the number of times data has been stored during execution of the first operating system 41 is small, the number of times data has been stored during execution of the second operating system 42 may be large.

The first operating system 41 does not always recognize information related to the second operating system 42. In other words, unless the execution unit 31 executes the above method for managing information, the percentage allowed for the number of times data can be written during execution of the first operating system 41 will be recognized as the first remaining percentage R1. Thus, even when situations such as the examples described in the preceding paragraph occurs, the first remaining percentage R1 for the first operating system 41 will not reflect the second remaining percentage R2.

Advantages of Embodiment (1) In the above embodiment, when the value of the first remaining percentage R1 is greater than the value of the total remaining percentage RA, the execution unit 31 changes the value of the first remaining percentage R1 to the value of the total remaining percentage RA. For example, the number of times data is written during execution of the first operating system 41 may be small, and the number of times data is written during execution of the second operating system 42 may be large. In this case, the value of the first remaining percentage R1 calculated in step S11 will be greater than the value of the total remaining percentage RA. After step S11, the value of the first remaining percentage R1 is changed to the value of the total remaining percentage RA in step S14. This reduces the value of the first remaining percentage R1 to the value of the total remaining percentage RA. Thus, the value of the first remaining percentage R1 reflecting the value of the total remaining percentage RA is recognized during execution of the first operating system 41.

In the above embodiment, the first operating system 41 obtains information related to the second operating system 42 only when calculating the value of the total remaining percentage RA. This restricts the transfer of information between the first operating system 41 and the second operating system 42.

(2) In the above embodiment, when the value of the second remaining percentage R2 is greater than the value of the total remaining percentage RA, the execution unit 31 changes the value of the second remaining percentage R2 to the value of the total remaining percentage RA. For example, the number of times data is written during execution of the second operating system 42 may be small, and the number of times data is written during execution of the first operating system 41 may be large. In this case, the value of the second remaining percentage R2 calculated in step S21 will be greater than the value of the total remaining percentage RA. After step S21, the value of the second remaining percentage R2 is changed to the value of the total remaining percentage RA in step S24. This reduces the value of the second remaining percentage R2 to the value of the total remaining percentage RA. Thus, the value of the second remaining percentage R2 reflecting the value of the total remaining percentage RA is recognized during execution of the second operating system 42.

(3) In the above embodiment, the execution unit 31 calculates the value of the total remaining percentage RA in response to a predetermined request signal received from an external device. Thus, the request signal will have to be received for the first operating system 41 to obtain the second remaining percentage R2 for the second operating system 42 or for the second operating system 42 to obtain the first remaining percentage R1 for the first operating system 41. This prevents inadvertent transfer of information between different operating systems by a person managing the vehicle 10.

Other Embodiments

The above-described embodiment may be modified as follows. The above-described embodiment and the following modification can be combined if the combined modifications remain technically consistent with each other.

The control system 11 does not need to be configured as in the example of the above embodiment. For example, some of the multiple ECUs may be omitted and other ECUs may be added.

The information management device 30 does not need to be a central ECU. The information management device may be any type of device that stores the first operating system 41 and the second operating system 42. For example, the advanced safety ECU 24 may serve as the information management device when storing the first operating system 41 and the second operating system 42.

The information management device 30 may be configured as circuitry including one or more processors that execute various types of processes according to a computer program (software). The information management device 30 may be configured as one or more dedicated hardware circuits such as an application specific integrated circuit (ASIC) that executes at least a part of various processes or a circuit including a combination thereof. The processor is, for example, a CPU. The RAM and the ROM form memory. The memory stores program codes or instructions configured to cause the CPU to execute processes. A non-transitory computer-readable storage media, such as ROM, includes any available media that can be accessed by a general-purpose or special-purpose computer.

The storage unit 32 may be of any type as long as there is a limitation to the number of times data can be written over its lifespan.

The first operating system 41 and the second operating system 42 do not need to run on the same hypervisor 33. For example, the first operating system 41 may run on the hypervisor 33, and the second operating system 42 may run without the hypervisor 33.

The storage unit 32 does not need to store the second information management program PR2. The storage unit 32 only needs to store at least the first information management program PR1.

The execution unit 31 may execute the first information management program PR1 and the second information management program PR2 at a time differing from the example of the above embodiment. For example, when the power of the vehicle 10 is turned on, the execution unit 31 may execute the first information management program PR1 to calculate the first remaining percentage R1 and the total remaining percentage RA. More specifically, the power of the vehicle 10 is turned on when the ignition switch of the vehicle 10 is operated. In this case, the execution unit 31 may execute the first information management program PR1. This allows the execution unit 31 to recognize the first remaining percentage R1 reflecting the total remaining percentage under the first operating system 41 each time the vehicle 10 is used.

The execution unit 31 does not need to calculate the first remaining percentage R1 as in the example of the above embodiment. For example, the execution unit 31 may calculate the first remaining percentage R1 each time data is written, and the storage unit 32 may store the calculated first remaining percentage R1. In this case, the execution unit 31 in step S11 may obtain the first remaining percentage R1 stored in the storage unit 32. The second remaining percentage R2 may be calculated in the same manner.

The execution unit 31 does not need to execute the second information management program PR2. The execution unit 31 only needs to execute at least the first information management program PR1.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An information management device, comprising:
a processor; and
a memory, wherein
the memory stores a first operating system and a second operating system,
the processor is configured to store data in a storage area of the memory when the first operating system is being executed,
the processor is configured to store data in the storage area of the memory when the second operating system is being executed,
the processor is configured to calculate a first remaining rate that is a rate of a remaining number of times data is allowed to be written to the storage area during execution of the first operating system relative to a first upper limit count, where the first upper limit count is a number of times data is allowed to be stored in the storage area during execution of the first operating system, and a second upper limit count is a number of times data is allowed to be stored in the storage area during execution of the second operating system,
the processor is configured to calculate a total remaining rate that is a rate of a remaining number of times data is allowed to be written to the storage area during execution of the first operating system and the second operating system relative to a total upper limit count obtained by adding the first upper limit count to the second upper limit count, and
the processor is configured to change a value of the first remaining rate to a value of the total remaining rate when the first remaining rate is greater than the total remaining rate.

2. The information management device according to claim 1, wherein
the processor is configured to calculate a second remaining rate that is a rate of a remaining number of times data is allowed to be written to the storage area during execution of the second operating system relative to the second upper limit count, and
the processor is configured to change a value of the second remaining rate to a value of the total remaining rate when the second remaining rate is greater than the total remaining rate.

3. The information management device according to claim 1, wherein the processor is configured to calculate the first remaining rate and the total remaining rate in response to a predetermined signal received from an external device.

4. The information management device according to claim 1, wherein the processor is configured to calculate the first remaining rate and the total remaining rate when power of a vehicle is turned on.

5. A non-transitory computer-readable storage medium storing an information management program applied to a computer, the computer including a memory storing a first operating system and a second operating system, and a processor configured to store data in a storage area of the memory when the first operating system and the second operating system are being executed, wherein
a first upper limit count is a number of times data is allowed to be stored in the storage area during execution of the first operating system, and a second upper limit count is a number of times data is allowed to be stored in the storage area during execution of the second operating system,
the information management program has the processor calculate a first remaining rate that is a rate of a remaining number of times data is allowed to be written to the storage area during execution of the first operating system relative to the first upper limit count,
the information management program has the processor calculate a total remaining rate that is a rate of a remaining number of times data is allowed to be written to the storage area during execution of the first operating system and the second operating system relative to a total upper limit count obtained by adding the first upper limit count to the second upper limit count, and
the information management program has the processor change a value of the first remaining rate to a value of the total remaining rate when the first remaining rate is greater than the total remaining rate.

6. A method for managing information performed by a computer, the computer including a memory storing a first operating system and a second operating system, and a processor configured to store data in a storage area of the memory when the first operating system and the second operating system are being executed, where a first upper limit count is a number of times data is allowed to be stored in the storage area during execution of the first operating system, and a second upper limit count is a number of times data is allowed to be stored in the storage area during execution of the second operating system, the method comprising:
calculating a first remaining rate that is a rate of a remaining number of times data is allowed to be written to the storage area during execution of the first operating system relative to the first upper limit count with the processor;
calculating a total remaining rate that is a rate of a remaining number of times data is allowed to be written to the storage area during execution of the first operating system and the second operating system relative to a total upper limit count obtained by adding the first upper limit count to the second upper limit count with the processor; and
changing a value of the first remaining rate to a value of the total remaining rate with the processor when the first remaining rate is greater than the total remaining rate.

* * * * *